United States Patent Office 3,224,988
Patented Dec. 21, 1965

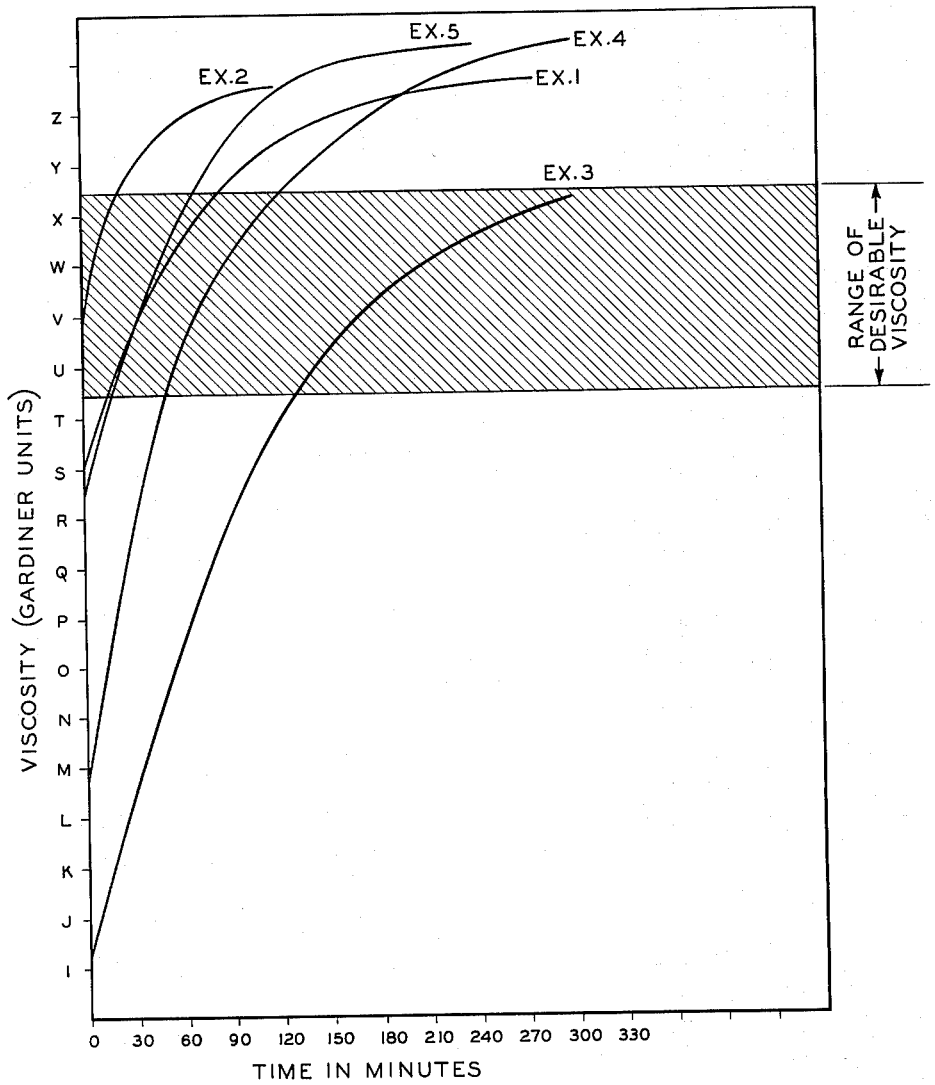

3,224,988
URETHANE OIL COATING COMPOSITION COMPRISING AN ORGANOTIN VISCOSITY CONTROL AGENT
Gerald R. Skreckoski, Buffalo, N.Y., assignor to Allied Chemical Corporation, New York, N.Y., a corporation of New York
Filed Dec. 29, 1960, Ser. No. 79,397
3 Claims. (Cl. 260—22)

This invention relates to stable, curable urethane coating compositions and more particularly refers to stable quick drying protective coating compositions of the so-called "urethane-oil" (isocyanate-modified drying oil) type and method of preparation.

In co-pending U.S. application Serial No. 800,363, filed March 19, 1959, now abandoned, entitled, "Quick-Drying Urethane Oil Compositions," is disclosed new and superior coating compositions produced by reacting organic polyisocyanates with partial esters of drying oil acids having incorporated 2–40% based on the hydroxyl and the ester groups of a polyether polyol having a molecular weight above 500, wherein the polyol-ester mixture contains from 0.5 to 5.0 free hydroxyl groups per ester linkage, wherein the ratio of free isocyanate groups in the polyisocyanate to free hydroxyl groups in the polyol-ester mixture is greater than 0.8, and wherein the reaction product of said organic polyisocyanate and said reaction mixture is substantially free from unreacted isocyanate groups. Although these novel and improved "urethane-oil" coating compositions have demonstrated outstanding properties, preparation of these compositions entailed some difficulty due to the variable rate at which the organic polyisocyanate and ester reactant reacted even when using materials from the same or closely similar batches. Because of this difficulty of control of the reaction occasional batches were "spoiled" in that the reaction proceeded on occasion at a rate to produce reaction products of undesirable characteristics or non-comparable characteristics.

An object of the present invention is to provide a method for producing stable, curable "urethane-oil" coating compositions which can be easily controlled to yield compositions of desired characteristics.

Another object of the present invention is to provide a method of producing stable, curable "urethane-oil" coating compositions of uniform properties.

A further object of the present invention is to provide stable, curable "urethane-oil" coating compositions which yield coatings having improved film strength characteristics.

Other objects and advantages will be apparent from the following description.

In the preparation of the "urethane-oil" coating composition the organic polyisocyanate and ester reactant are heated to effect reaction to produce a coating composition of the desired characteristics. As the reaction proceeds the viscosity increases and the extent to which the reaction is carried out is generally determined by viscosity of the composition. The time required for the viscosity to increase from a viscosity of T–U to X–Y, Gardiner Units, the range of desirable viscosity of the coating composition, is a measure of the rapidity of the reaction and the ability to obtain reproducible results. In the past it was found that the reaction times from similar batches of reactants required from as low as 3 to as long as 12 hours to obtain reaction products of comparable characteristics thus imposing a heavy burden on the operators to control the reaction. This problem of control is especially troublesome when it is considered that the reaction is relatively rapid through the desired range of viscosity of T–U to X–Y, passing through that range in the relatively short period of about 15 to 75 minutes. The problem is to materially extend the time of reaction during which the viscosity passes through the desired range of T–U to X–Y thus enabling the operators to more readily control the reaction to produce the coating composition of the desired properties.

I have discovered that the addition of a small amount of a certain viscosity control agent to the reaction mixture of organic polyisocyanate and ester reactant has the effect of levelling off or retarding the rate of viscosity increase through the desired range of T–U to X–Y. Merely as illustrative the effect of this viscosity control agent is to extend the reaction time about threefold for passage through the important T–U—X–Y viscosity range. In practice it has been found that this results in the production of coating compositions of the desired characteristics and comparable properties.

The viscosity control agent can be represented by the general formula

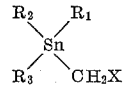

wherein CH$_2$X represents a hydrocarbon alkane radical of from 1 to 18 carbon atoms, R$_1$, R$_2$, R$_3$ represent a hydrocarbon alkane radical of from 1 to 18 carbon atoms, hydrogen, halogen or a hydrocarbon acyl group (e.g., acetyl, propionyl, octanoyl, lauroyl), R$_1$, R$_2$ and R$_3$ being alike or different, and further two members of this group R$_1$, R$_2$ and R$_3$ together being oxygen or sulfur.

Typical of the organotin salts having the above general formula the following can be mentioned.

Tetramethyltin
Tetra-n-butyltin
Tetraoctyltin
Dimethyldioctyltin
Tetraethyltinchloride
Dioctyltindichloride
Di-n-butyltindibromide
Dilauryltin difluoride
2-ethylhexyltin triiodide
Dimethyltinoxide
Di-n-octyltinoxide
Di-n-butyltindilaurate
Di-n-butyltindiacetate
Di-n-octyltinbis(monobutylmaleate)
Di-2-ethylhexyltinbis(2-ethylhexanoate)

Dibutyltindilaurate, because of its ready availability and effectiveness is a preferred member of this class of organotin salts.

The amount of organo tin salt used to catalyze the reaction can be varied over a considerable range. Inasmuch as these salts act primarily as viscosity control substances, only minor amounts, as little as 0.001% by weight of the resin mixture, are necessary to obtain significant improvements. Larger amounts, more than 0.5%, because of the exothermic nature of the reaction can result in explosive hazards. Preferably from 0.005 to 0.1% by weight should be used and especially 0.01% to 0.05% by weight will produce the significant improvements desired in an easily controllable manner.

The peculiar action of these organotin compounds to effect a levelling off of viscosity during the reaction is unexpected and surprising since tin compounds are regarded as catalysts to accelerate the reaction. Also ordinarily the introduction of foreign materials into coating compositions tend to deteriorate its properties. Fortunately, the incorporation of the organotin compound in the present invention had no detrimental effect on the properties of the coating composition and in fact, materially increased the Sward hardness and tensile strength of the film from such composition.

The improved coating compositions of this present invention comprise a film-forming component which is the product of the improved process described more fully hereinbelow in a volatile solvent, a catalyst or "drier" to accelerate the film-forming reaction after application of the coating, and optionally, a stabilizer to insure storage stability. The improved film-forming component of this invention is the product of the reaction of an organic polyisocyanate with a reactant mixture selected from the group consisting of ester mixtures and ester-polyol mixtures wherein the esters in said reactant mixtures are predominantly partial esters of unsaturated fatty acids characteristic of glyceride drying oils, wherein said reactant mixture contains from 0.5 to 5.0 preferably 1.5 to 3.0, free hydroxyl groups per ester linkage present, wherein 2% to 40% preferably 3% to 9% of the total of (a) the free hydroxyl and (b) the ester groups present in the said reactant mixture are groups which are bonded to structural residues of the polyether polyols having molecular weights above 500 and preferably below 5000, the reaction between the organic polyisocyanate and the said reactant mixture being conducted in the presence of an organotin salt catalyst of the preferred formula

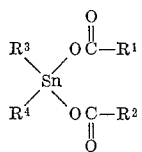

wherein $R^1$, $R^2$, $R^3$, $R^4$ may be alike or different hydrocarbon alkyl groups containing from 1 to 18 carbon atoms, wherein the ratio of the number of free isocyanate groups to the number of free hydroxyl groups in said reactant mixture is greater than 0.8 and wherein said reaction product of said organic polyisocyanate and said reactant mixture is substantially free from unreacted isocyanate groups.

In accordance with the present invention, the improved coating compositions can be prepared by a process which involves the following steps.

(1) The ester mixture or ester-polyol mixture is first prepared by either (a) transesterifying a glyceride drying oil with a polyol or (b) directly esterifying the polyol with unsaturated fatty acid or mixture of fatty acids characteristic of the drying oil. All of the polyol used to prepare the esterification product can be charged prior to the esterification or transesterification reaction. Alternatively the polyol can be added in portions before, during, and after the esterification or transesterification reaction. The composition of the resultant esterification mixture or ester-polyol mixture is such that (a) it contains 0.5 to 5.0, and preferably 1.5 to 3.0 free hydroxyl groups per ester linkage present and (b) from 2% to 40%, and preferably from 3% to 9%, of the total of the free and esterified hydroxyl groups present are bonded to structural residues of polyether polyols having molecular weights above 500.

(2) To the resultant ester mixture or ester-polyol mixture at least about 0.001% by weight of an organotin salt, of the general formula disclosed hereinabove, and preferably di-n-butyl tin diacetate or di-n-butyl-tin dilaurate, is added. The mixture is heated to between about 50° and 75° C.

(3) The heated mixture is charged, gradually, with an organic polyisocyanate in amount sufficient to contain at least 0.8, and preferably about 1.0 isocyanate group per free hydroxyl group present in the ester or ester-polyol mixture. Preferably the polyisocyanate is added in increments which alternate with incremental additions of a solvent which is added to maintain the fluidity required for adequate mixing.

(4) The remaining solvent required by the formulation is added and heating of the mixture is continued until the desired viscosity is attained.

(5) The free isocyanate content of the coating composition is determined and sufficient stabilizer (e.g. methanol) is added. Even if no free isocyanate groups be present, and the addition of the stabilizer is believed not to be necessary, it is good practice to add a minimum amount, e.g., 0.5% by weight of the said stabilizer. The free isocyanate group content can be controlled either (a) by addition of an amount of polyisocyanate calculated to produce in the coating composition not more than 1.0 free isocyanate group per hydroxyl group present in the ester or ester-polyol mixture or (b) by continuing the reaction to the point where all the isocyanate groups present have reacted. Any isocyanate used in this process which is much in excess of an amount which will result in a reaction product having much in excess of 1.0 free isocyanate group per hydroxyl group in the ester or ester-polyol mixture, is surplusage.

(6) Catalyst or "driers" which accelerate the film-forming reaction in the applied coating are next added. These adjuvants also accelerate the reaction between the stabilizer and free isocyanate groups, if present.

Drying oils are well known in the art as raw material sources for long chain unsaturated fatty acids which are used for the direct esterification reaction with polyols or for use directly in the transesterification reaction leading to the ester-polyol mixtures. Of this broad class of oils, the following can be mentioned as suitable representatives:

| | |
|---|---|
| Linseed oil | Poppyseed oil |
| Soybean oil | Olive oil |
| Cottonseed oil | Tall oil |
| Tung oil | Fish oil |
| Peanut oil | Dehydrated castor oil |
| Sunflower oil | Rapeseed oil |
| Perilla oil | Safflower oil |
| Articica oil | |

The present invention contemplates the use of such oils which have been modified by the well known processes of "bodying" or blowing as well as mixtures of such oils.

Particularly useful are the more readily available soybean, linseed and dehydrated castor oils.

A wide group of polyols suitable for use in the present invention are available. These polyols and particularly polyether polyols have molecular weights above 500 which can be used to prepare the ester or ester-polyol mixtures include polyalkylene ether diols, e.g., polyethylene glycol, polypropylene glycol, polybutylene glycols as well as polyalkyleneglycols containing different akylene units (e.g. ethylene and propylene units) in the molecule and mixtures of such polyols. Of especial utility are polyether triols prepared by an alkylene oxide, e.g., ethylene oxide or propylene oxide or mixtures thereof, with glycerine. Such polyether triols have the structure

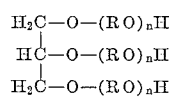

wherein R represents an alkylene group and $n$ represents the number of alkylene oxide groups per chain. All of the "R" alkylene groups in the molecule are not necessarily of the same structure, i.e., some can be ethylene units, others propylene units, etc. Polyether triols of this type are available from the Dow Chemical Co. under the following designation.

| Name | Average molecular weight |
|---|---|
| Polyglycol 11–85 | 700±50 |
| Polyglycol 11–100 | 1030±100 |
| Polyglycol 11–200 | 2700±200 |
| Polyglycol 11–300 | 4000±350 |
| Polyglycol 11–400 | 4900±350 |
| Polyglycol 112–3 | 3000±300 |
| Polyglycol 15–200 | app. 2600 |

Other triols than glycerine can be used as the central nucleus to form useful polyether glycols of this suitable nature. Thus such polyglycols as trimethylol ethane, trimethylol propane hexane triol 1,2,6 and the like as well as polyether tetrols formed of a central nucleus derived from erythritol or pentaerythritol can be reacted with an alkylene oxide to form a suitable polyetherglycol.

The other polyols entering into the composition of the ester mixture or ester-polyol mixture can be selected from a wide group of which the following are representative: Glycerine, trimethylol ethane, trimethylol propane, triethanolamine, hexanetriol-1,2,6, ethylene glycol, propylene glycol, diethylene glycol, propylene glycol, polyalkylene glycols having molecular weights below 500, erythritol, pentaerythritol, sorbitol, mannitol and the like, as well as polyether polyols of the above defined types (i.e. "Polyglycol" series of polyether triols, products of the Dow Chemical Co.) having molecular weights below 500.

From 2% to 40% of the total number of hydroxyl groups (or hydroxy group equivalents) of the polyols entering into the composition of the ester mixture or ester-polyol mixture should be bonded to structural residues of the polyether triols having molecular weights above 500. By the expression "total number of hydroxyl groups of the polyols entering into the composition" is means the sum of the free hydroxyl groups and esterified hydroxyl groups present in the mixture. This number, obviously, does not change during the course of the reaction. If the mixture is prepared by direct esterification the total number of hydroxyl groups entering into its composition will be equal to the sum of the hydroxy groups (or equivalent groups) of the individual components charged to the process. If the mixture is prepared by transesterification of a mixture of a polyol and a natural triglyceride, the total number of hydroxyl groups entering into the composition of the mixture includes not only the sum of the hydroxyl groups of the individual components of the polyol mixture charged to the process but also the number of hydroxyl groups (free and esterified) represented by the glycerine residue contained in the molecular structure of the triglyceride.

The number of hydroxyl groups represented by a given weight of polyol component charged to the synthesis batch is given by the expression:

$$\frac{\text{Weight in grams of polyol component charged} \times \text{Number of hydroxyl groups per molecule of polyol}}{\text{Molecular weight of polyol component charged}}$$

The number of hydroxyl groups represented by a given weight of triglyceride charged to the batch is given by the expression:

$$\frac{\text{Weight in grams of triglyceride component charged} \times \text{Saponification No.} - \text{Acid No. of triglyceride}}{56{,}100}$$

The acid number of the triglyceride is usually so small that it can be neglected in making this calculation.

The proportion of polyol to unsaturated fatty acid or glyceride thereof used in the preparation of the ester or ester-polyol mixture is such that said mixture shall contain from 0.5 to 5.0 free hydroxyl groups per ester linkage present. If the ester component is prepared by direct esterification of unsaturated fatty acids, the number of ester equivalents present in the resultant product is given by the expression:

$$\frac{\text{Weight in grams of acid charged} \times \text{Neutralization number of acids charged}}{56{,}100}$$

The number of free hydroxyl groups present can be calculated by subtracting the number of ester groups present from the number of hydroxyl groups charged. If the ester component is prepared by transesterification of a natural triglyceride, the number of ester groups present is given by the expression:

$$\frac{\text{Weight in grams of triglyceride charged} \times \text{Saponification No. of triglyceride}}{56{,}100}$$

In this case, the number of free hydroxy groups present is equal to the number of hydroxyl groups in the free polyol charged providing, as is usually the case, that the acid number of the triglyceride is negligibly small. If this be not so, the number of hydroxyl groups present in the polyol charged is decreased by the number of acid equivalents in the triglyceride charged to obtain the number of free hydroxyl groups in the product. The number of acid equivalents in the triglyceride charged is given by the expression:

$$\frac{\text{Weight in grams of triglyceride charged} \times \text{Acid No. of triglyceride}}{56{,}100}$$

In a preferred method of operation a triglyceride is transesterified with a mixture of glycerine and a polyether triol having a molecular weight above 500, assisted by a transesterification catalyst. If the ratio of free hydroxyl groups to ester groups in the product is 0.5 the product has an average composition corresponding to that of a triol diester, i.e., a synthetic diglyceride. If the said ratio is 2.0, the product has an average composition corresponding to a monoglyceride, that of a triol monoester. If the ratio exceeds 2.0, the resulting product has an average composition corresponding to that of a mixture of monoglyceride and excess unesterified triol. As a general rule, higher ratios of free hydroxyl groups to ester linkages favor faster drying times, but also favor harder and more brittle films. However, a feature of the present invention resides in the incorporation of the polyether glycol components having moelcular weights above 500 which favor improved flexibility and adhesion of the films.

Any of a wide variety of organic polyisocyanates or mixture thereof is suitable for use in the present invention. The liquid polyisocyanates and especially liquid diisocyanates are preferred. As representative of this component the following examples can be mentioned:

M-phenylene diisocyanate
2,4-tolylene diisocyanate
2,6-tolylene diisocyanate
1,5-naphthalene diisocyanate
4,4-methylene-bis-(phenyleneisocyanate)
1,6-hexamethylene diisocyanate
4,4'-methylene-bis-(cyclohexylisocyanate)
4,4'4''-triphenylmethane-triisocyanate
1,3,5-benzene triisocyanate triisocyanate product obtained by reacting 1 mol of a triol such as trimethylolpropane with 3 mols of a diisocyanate such as 2,6-tolylene diisocyanate.

It is general practice to use solvents both to provide a stirrable reaction medium and to provide a flowable coating composition. In the present invention it is convenient and hence preferred to utilize a solvent which is adequate for both purposes. Hence, the solvents used in this invention are similar to the conventional varnish solvents. Since the drying rate of the usual coating is largely determined by the evaporation rate of the solvent (the "tack-free" drying time of the solvent free coating being only a minute or two), the suitable solvents will be selected primarily on the basis of their high volatility. Typical of such solvents are Toluene
Xylene
Low boiling petroleum hydrocarbon distillate fractions
Toluene—methylene chloride mixtures
Isopropyl ether
Esters such as ethyl acetate
Ketones such as methyl ethyl ketone, cyclohexanone Since the solvent is used also to thin the reaction medium during the addition of the polyisocyanate component, it should be substantially free of active hydrogen containing groups, as determined by the well known Zeravitnoff Test (c.f. Kohler et al., J.A.C.S. 40 3181–8 (1927)). Such active hydrogen (i.e. the hydrogen of an alcoholic hydroxyl or free carboxylic acid group) would react with the isocyanate groups present. Accordingly, in the preferred instance, the solvent used to thin the reaction mixture and to provide a flowable coating composition should be free of such active hydrogen moieties. However, the invention includes the use of solvents such as methanol containing such active hydrogen moieties to be added after the reaction between the polyisocyanate and the ester mixture.

Concentration ranges of 40% to 80% non-volatiles are preferred for the final compositions. Prior to application the coating composition can be diluted to as low as 10% non-volatiles. The more dilute compositions are better adapted for spray application in some equipment. A substance providing shelf stability of the coating composition is generally added. Such stabilizing substances include the simple aliphatic alcohols, particularly the primary alcohols such as methanol, ethanol, and butanol.

"Driers" used to catalyze and otherwise accelerate the film-forming reaction are included in the novel coating compositions of this invention. The "driers" used are the same as those used in the more conventional varnish formulations. Typically, the naphthenates or equivalent oil-soluble salts of cobalt, lead or manganese are used and are particularly suitable in these coatings. They are conveniently added to the batch as solutions in mineral spirits, after all the solvent required by the formulation has been added. They should be added after the addition of the storage stabilizers.

In carrying out the process of the present invention the first step involves either (a) Transesterification by heating a polyol-triglyceride mixture in an inert atmosphere at elevated temperature (e.g. 200° to 250° C.) for a suitable period (e.g. 2 hours) and in the presence of a transesterification catalyst such as calcium naphthate, litharge, zinc oxide, caustic soda or the like; or (b) Direct esterification by heating a mixture of a polyol and unsaturated fatty acids in an inert atmosphere, at an elevated temperature (e.g. 150° to 200° C.) while removing water as formed.

Upon completion of the transesterification or direct esterification reaction, the resultant product is cooled to about 50° C. If all the polyol was not charged to the ester-forming reaction mass, the additional polyol is added at this time.

Thereafter, the organotin salt catalyst is added followed by the gradual addition of the polyisocyanate component. During the latter addition the temperature is maintained at about 50° to 65° C. Usually the exothermic heat of reaction suffices to provide the reaction temperature and in fact, external cooling is sometimes necessary. Partial control of this temperature can be attained by adjusting the rate of addition of the polyisocyanate and/or addition of solvent during this stage.

During the addition of polyisocyanate, the reaction mixture is agitated. As the reaction proceeds the mass thickness and fluidity is maintained by the addition of solvent, as and if necessary. When the reaction between the polyisocyanate and free hydroxyl groups of the ester mixture or ester-polyol mixture is substantially complete, the remaining solvent required by the formulation is added and the batch is agitated at about 70° C. until the desired viscosity is obtained. Thereafter the batch is cooled to between 50° and 60° C. and the stabilizer is added. Although as indicated above the stabilizer is not necessary unless free isocyanate groups are present, it is preferred to add the stabilizer to provide an additional margin of safety, especially in those instances wherein the coating composition may be held for prolonged periods before use and for products which will be subjected to relatively high storage temperatures as in the Torrid Zone.

The free isocyanate content of the coating composition can be determined by the procedure described by Siefkin (Liebig's Annalin d. Chemie 562, 99 (1949)). Finally "driers," pigments and other adjuvants are added, as required and desired.

The coating compositions can be stored indefinitely without deterioration due to "gelling." This follows from the absence of free isocyanate groups resulting not only from the presence of the stabilizers but also from the completeness of the reaction in the presence of the organotin salts.

The coatings can be applied in any manner conventional in the varnish and lacquer field. Thus application methods involving brushing, dipping and spraying can be used. Spraying is preferred for fabric or leather coatings. In this application method it is usually desirable to thin out the coating composition with a suitable "thinner" e.g., ethyl acetate or mixtures thereof with xylene, hexane and the like.

The film-forming reaction in the applied coatings is analogous to that of the conventional varnish, involving as it does the cross-linking reaction between the points of unsaturation of the fatty acid residues. It is dissimilar from that of the usual urethane coating formulation in that it does not involve reactions at the sites of the urethane groups to any significant extent.

The invention will now be described by means of the following illustrative examples. Parts are by weight, temperatures are given in degrees centigrade, and viscosities are measured on the Gardiner-Holt Scale at 50% non-volatiles content.

EXAMPLE 1

The transesterified ester was prepared as follows. A mixture consisting of 1595 parts of linseed oil, 276 parts of glycerin, 249 parts of a poly(oxypropylene) adduct of glycerin which is a polyether triol produced by reaction of glycerin with propylene oxide said triol having a molecular weight of about 1000 and a hydroxyl value of 168 ("Niax Triol LG–168"—trademark of Union Carbide Chemical Company), and 5.4 parts of calcium naphthenate (0.4% solution) was heated in an atmosphere of nitrogen at 250° for 2 hours while being agitated continuously. The mixture was cooled thereafter to between 50° and 60°.

To 141.6 parts of the transesterified linseed oil ester prepared above and preheated to 50°, 58.4 parts of "Nacconate 80" (a mixture of 80 parts of 2,4 and 20 parts of 2,6-tolylene diisocyanate) were added during 30 minutes while holding the temperature at 60° or below. Thereafter, 200 parts of "Solvesso 150" (a mixture of aromatic hydrocarbons having a flash point of 60.4°±.2°, product of Esso) were added in one hour as the temperature was gradually increased to 85° and maintained thereat for 4½ hours. Periodically the viscosity of the mixture was determined as indicated in Table 1.

EXAMPLE 2

For purposes of illustrating the difficulty in obtaining reproducible results, the procedure of Example 1 was repeated. In Table 1 are tabulated changes in viscosity with time employing the same reactants under apparently the same conditions thereby demonstrating the difficulty confronting operators to obtain products of uniform characteristics.

Table 1

| Time (min.) | Viscosity of Batch | |
| --- | --- | --- |
| | Example 1 | Example 2 |
| 0 | S | U– |
| 30 | V– | Y+ |
| 60 | W–X | $Z_3$+ |
| 90 | ---------- | $Z_5$–$Z_6$ |
| 120 | Y–Z | $Z_6$++ |
| 180 | $Z_1$–$Z_2$ | ---------- |
| 240 | $Z_3$–$Z_4$ | ---------- |
| 270 | $Z_4$–$Z_5$ | ---------- |

EXAMPLE 3

The procedure of Example 1 was repeated with the following exceptions. 0.04 part (0.02%) of di-n-butyltindilaurate catalyst was added to the preheated transester prior to addition of "Nacconate 80" and temperature was maintained at 60° after the addition of solvent. The viscosity results are tabulated in Table 2.

EXAMPLE 4

The procedure of Example 3 was repeated but 0.02 part (0.01%) of ferric acetylacetonate was used to catalyze the reaction instead of di-n-butyltindilaurate catalyst. The viscosity determinations are listed in Table 2.

EXAMPLE 5

The procedure of Example 3 was repeated but 0.02 part (0.01%) of a 24% solution of lead naphthenate was used in place of di-n-butyltindilaurate catalyst. The viscosity data is listed in Table 2.

Table 2

| Time (Min.) | Viscosity | | |
| --- | --- | --- | --- |
| | Example 3 | Example 4 | Example 5 |
| 0 | I+ | M– | R–S |
| 30 | L | T–U | V |
| 60 | O+ | U–V | W–X |
| 90 | ---------- | V–W | Y– |
| 120 | T–U | ---------- | $Z_1$– |
| 150 | ---------- | X–Y | $Z_2$– |
| 180 | V– | ---------- | $Z_3$– |
| 210 | ---------- | Z–$Z_1$ | $Z_4$– |
| 240 | W–X | ---------- | $Z_4$+ |
| 270 | ---------- | $Z_2$–$Z_3$ | ---------- |
| 300 | X–Y | $Z_3$–$Z_4$ | ---------- |

The data in Tables 1 and 2 are plotted on the drawing. The time required for the viscosity to increase from a viscosity of T–U to X–Y, the range of desirable viscosity of the coating composition, is a measure of the rapidity of the reaction and the ability to obtain reproducible results. As indicated the uncatalyzed batches (Ex. 1, Ex. 2) required only about 15 to 75 minutes, the Pb and Fe catalyzed batches (Ex. 4, Ex. 5) required about 55 and 75 minutes, whereas the organotin catalyzed batch (Ex. 3) required at least about 165 minutes.

Although certain preferred embodiments of the invention have been disclosed for purpose of illustration, it will be evident that various changes and modifications may be made therein without departing from the scope and spirit of the invention.

I claim:

1. A method for producing a film-forming component for protective coatings which comprises first admixing and heating from about 50° to about 75° C. a reactant mixture selected from the group consisting of ester mixtures and ester-polyol mixtures wherein the esters in said reactant mixture are predominately partial esters of unsaturated fatty acids characteristic of glyceride drying oils, wherein said reactant mixture contains from 0.5 to 5.0 free hydroxyl groups per ester linkage present, wherein from 2% to 40% of the total of (a) the free hydroxyl and (b) the ester groups present in said reactant mixture are groups bonded to structural residues of polyether polyols having molecular weights above 500, and about 0.001% by weight to about 0.5% by weight, based on the weight of the reactant mixture, of an organotin viscosity control agent of the formula

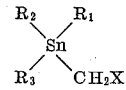

wherein $CH_2X$ represents a hydrocarbon alkane radical of from 1 to 18 carbon atoms, wherein $R_1$ is a member of the group consisting of a hydrocarbon alkane radical of from 1 to 18 carbon atoms, hydrogen, halogen and a hydrocarbon acyloxy group, wherein $R_2$ and $R_3$ are members of the group consisting of a hydrocarbon alkane radical of from 1 to 18 carbon atoms, hydrogen, halogen, a hydrocarbon acyloxy group, an oxygen atom joined to the tin atom by a double bond at positions $R_2$ and $R_3$, and a sulfur atom joined to the tin atom by a double bond at positions $R_2$ and $R_3$, and then admixing the reactant mixture and organotin viscosity control agent with an organic polyisocyanate, wherein the ratio of the number of free isocyanate groups to the number of free hydroxyl groups in said reactant mixture is greater than 0.8 and wherein said reaction product of said organic polyisocyanate and said reactant mixture is substantially free of unreacted isocyanate groups.

2. The process as claimed in claim 1 wherein the organotin viscosity control agent is dibutyltindilaurate.

3. The process as claimed in claim 1 wherein the organotin viscosity control agent is dibutyltindiacetate.

References Cited by the Examiner

UNITED STATES PATENTS

| 2,968,575 | 1/1961 | Mallonee | 260—18 |
| 3,084,177 | 4/1963 | Hostettler et al. | 260—2.5 |
| 3,148,162 | 9/1964 | Gmitter et al. | 260—2.5 |

FOREIGN PATENTS 1,210,366  3/1960  France.

LEON J. BERCOVITZ, *Primary Examiner.*

M. STERMAN, DONALD E. CZAJA, *Examiners.*